United States Patent Office 3,206,370
Patented Sept. 14, 1965

3,206,370
NUCLEAR REACTOR CORE
Ronald Hugh Campbell, Bowdon, and Ronald Scott Challender, Appleton, England, assignors to United Kingdom Atomic Energy Authority, London, England
Filed May 23, 1963, Ser. No. 282,722
Claims priority, application Great Britain, June 4, 1962, 21,433/62
4 Claims. (Cl. 176—40)

This invention relates to nuclear reactors of the kind using hexagonal fuel elements clustered so as to be in contact with one another except at voids permitting coolant flow over the elements.

The hexagonal shape permits clustering into sub-groups of nineteen—one innermost (which may be dummy), six in the inner ring and twelve in the outer ring—which produces a hexagonal outline. The hexagonal sub-groups may themselves be clustered into a full group of seven sub-groups (one innermost and six in an outer ring). However, the need for control rod space arises and typically this may require the space occupied by a group of seven fuel elements which, from a sub-group, leaves twelve elements as a ring round the control rod. It is not practicable to discharge these twelve elements without first removing the control rod and its guide tubes, etc.

According to the present invention, in a reactor of the kind described, a full-group fuel assembly of the core comprises six similar sub-group fuel assemblies arranged symmetrically to define a void, each sub-group fuel assembly comprising twenty-one fuel elements (the innermost of which may be a dummy) arranged in a hexagonal group of nineteen with the appendage of two fuel elements to that side of the hexagonal group facing the void. Preferably the void defines a control rod station for the reactor core.

The invention will be further described with reference to the accompanying drawings wherein.

Figure 1:
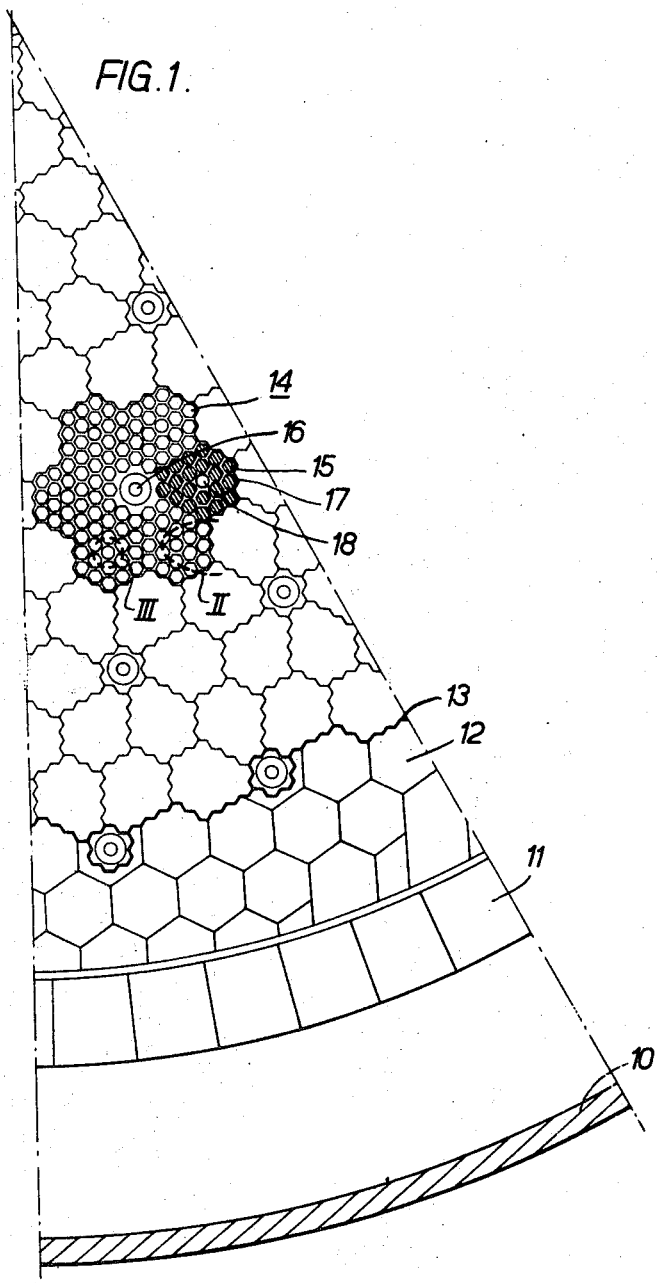
FIGURE 1 is a diagrammatic plan view of a part of a reactor core.
Figure 2:
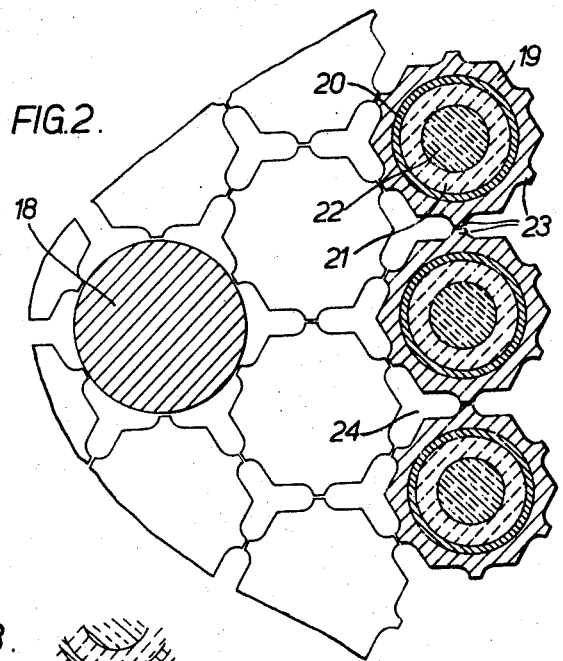
FIGURE 2 is a fragment of FIGURE 1 indicated by the dotted line II showing the fuel construction in more detail.

FIGURE 1 shows a 30° sector of the core of a reactor. A steel pressure vessel 10 encloses a reactor core comprising an outer graphite reflector made of arch blocks 11 and spaced from an inner graphite reflector made of basically hexagonal blocks 12. The fuel containing part of the core is indicated in outline by the heavy line 13. The core itself comprises sixty "full-group" fuel assemblies 14 each made up from six "sub-group" fuel assemblies 15 and a control rod 16. Each sub-group assembly comprises a cluster of twenty fuel elements 17 and a dummy graphite plug 18 as shown in more detail in FIGURE 2.

Each fuel element 17 has an outer graphite sleeve 19, a graphite sheath 20 (usually called a fuel box), fuel inserts 21 and a graphite spine 22. The fuel inserts are a loose fit in the fuel boxes 20 and the boxes 20 are a loose fit in the sleeves 19 so that spaces exist along which a purge gas can flow to sweep away fission products. Where fission product retaining fuel can be used these spaces are, of course, not required. The elements 17 come together at projections 23 and thereby define Y-shaped channels 24 along which coolant gas can flow.

Figure 3:
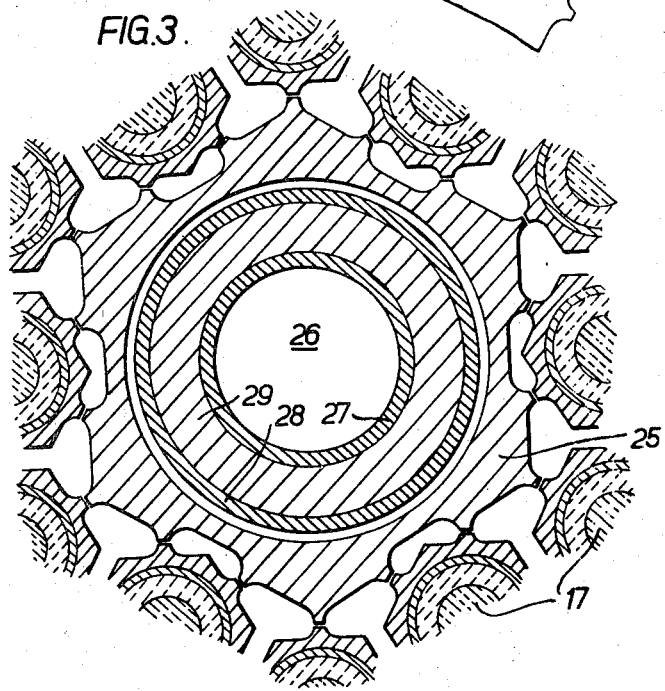
FIGURE 3 is another fragment of FIGURE 1 indicated by the dotted circle III showing the control rod in more detail.

The control rod assembly shown in FIGURE 3 has a graphite sleeve 25 which acts as a guide tube and also serves to support adjacent fuel elements 17 and inside the guide tube the control rod 26 made up of inner and outer graphite sleeves 27, 28 with boron carbide inserts 29 between the sleeves.

The "sub-group" fuel assemblies can be removed from the reactor core by a vertical lift effected by a grab which engages the bottom of each fuel assembly. Access to the bottom of the fuel assembly is gained by removing the dummy plug 18.

We claim:

1. A nuclear reactor core comprising at least one full-group fuel assembly including six similar sub-group fuel assemblies arranged symmetrically to define a void, each sub-group fuel assembly comprising twenty-one fuel elements arranged in a hexagonal group of nineteen with the appendage of two fuel elements to that side of the hexagonal group facing the void.

2. A nuclear reactor core according to claim 1, wherein said void defines a control rod station.

3. A nuclear reactor core according to claim 1, wherein each sub-group fuel assembly has a lifting attachment and the innermost fuel element of the assembly is a dummy which is removable to give access to the attachment.

4. A nuclear reactor core according to claim 2, wherein the sub-group fuel assembly has a lifting attachment and the innermost fuel element of the assembly is a dummy which is removable to give access to the attachment.

References Cited by the Examiner

UNITED STATES PATENTS 3,076,753   2/63   Bell ------------------ 176—61

FOREIGN PATENTS 222,480   6/59   Australia.

CARL D. QUARFORTH, *Primary Examiner.*